United States Patent
Chen et al.

(10) Patent No.: US 7,324,316 B2
(45) Date of Patent: Jan. 29, 2008

(54) HOT-SWAP CIRCUIT SYSTEM FOR FAN TRAY MODULE

(75) Inventors: Hunter Chen, Taoyuan Hsien (TW); Chun-Lung Chiu, Taoyuan Hsien (TW); Wen-Shi Huang, Taoyuan Hsien (TW)

(73) Assignee: Delta Electronics, Inc., Taoyuan Hsien (TW)

( * ) Notice: Subject to any disclaimer, the term of this patent is extended or adjusted under 35 U.S.C. 154(b) by 219 days.

(21) Appl. No.: 11/179,656

(22) Filed: Jul. 13, 2005

(65) Prior Publication Data

US 2006/0012929 A1  Jan. 19, 2006

(30) Foreign Application Priority Data

Jul. 16, 2004  (TW) ............................... 93121277 A (51) Int. Cl.
*H02H 9/08* (2006.01)
(52) U.S. Cl. .................................................... 361/93.9
(58) Field of Classification Search ............... 361/93.1, 361/93.9, 91.1
See application file for complete search history.

(56) References Cited

U.S. PATENT DOCUMENTS

| | | | | |
|---|---|---|---|---|
| 5,587,685 A | * | 12/1996 | Johansson | 327/546 |
| 5,898,844 A | * | 4/1999 | Thompson | 710/302 |
| 6,771,478 B2 | * | 8/2004 | Ochi | 361/118 |
| 2004/0090726 A1 | * | 5/2004 | Ball | 361/93.9 |
| 2004/0177201 A1 | * | 9/2004 | Cherniski et al. | 710/302 |

* cited by examiner

*Primary Examiner*—Michael Sherry
*Assistant Examiner*—Boris Benenson
(74) *Attorney, Agent, or Firm*—Birch, Stewart, Kolasch & Birch, LLP (57) ABSTRACT

A hot-swap circuit system for fan tray module includes a soft-start circuit module in charge of the power start of the fan tray module hot-plugged into an application system. The soft-start circuit module includes a capacitor and a field effect transistor. The capacitor discharges and the field effect transistor turns off when an input voltage is changed from a certain value to zero.

20 Claims, 8 Drawing Sheets

HOT-SWAP CIRCUIT SYSTEM FOR FAN TRAY MODULE

BACKGROUND OF THE INVENTION

1. Field of the Invention

The invention relates in general to a circuit system for a fan tray module. In particular, the invention relates to a hot-swap circuit system for a fan tray module.

2. Brief Discussion of the Related Art

At the moment of hot plugging a fan tray module in an application system and activating the fan tray module, the application system will generate voltage spikes and inrush currents while sending out sparks due to the power supply terminal thereof suddenly taking the load of the fan tray module. The voltage spikes and inrush currents will mistakenly trigger the over-voltage protection device and the over-current protection device installed in the power supply terminal of the application system, and therefore crash the application system.

To avoid the described problems, a hot-swap circuit generally is provided to a fan tray module such that the fan tray module carries out a soft-start operation when plugged into an application system, thereby suppressing voltage spikes and inrush currents generated in the application system at the moment of activating the fan tray module.

Figure 1:
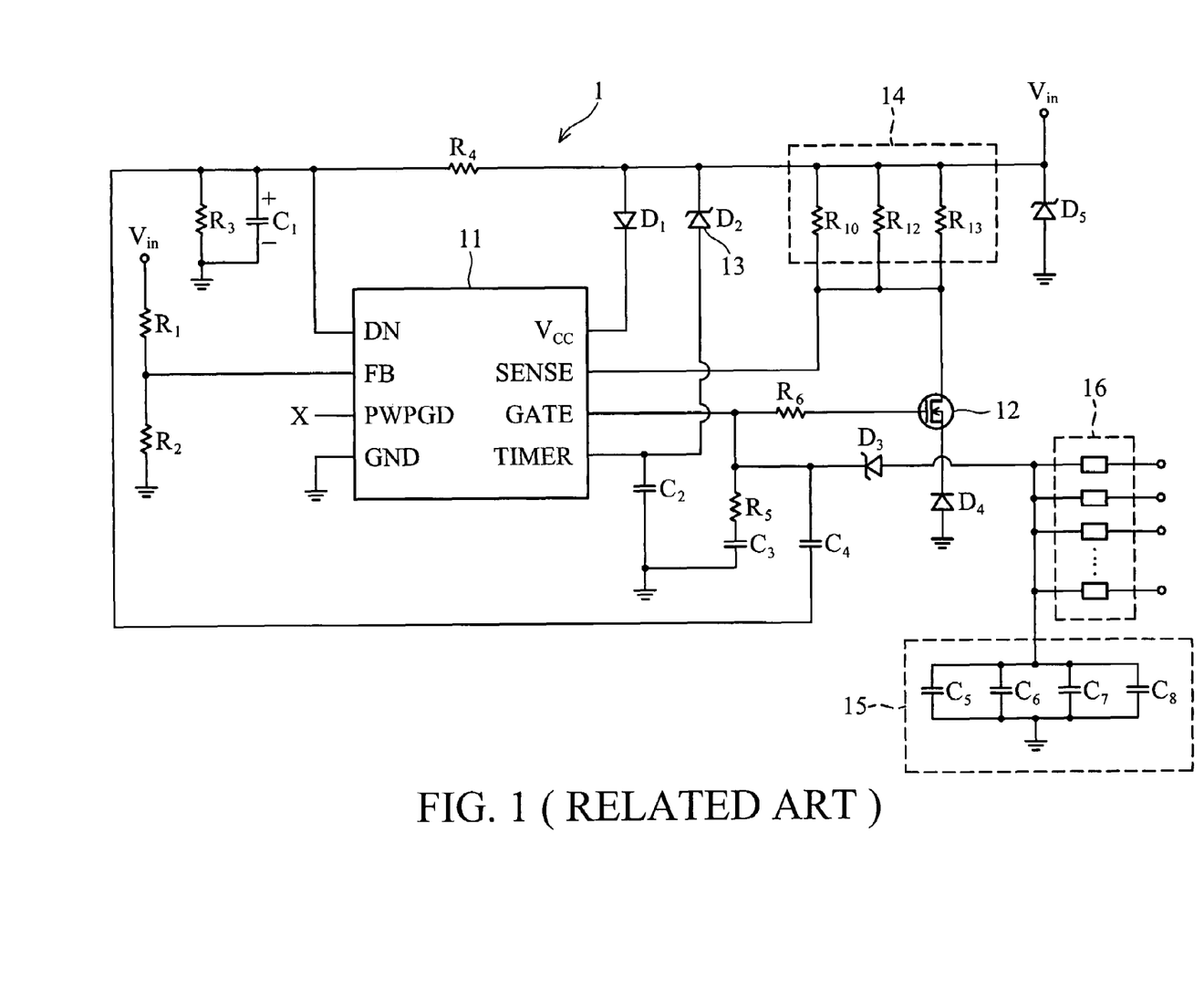
FIG. 1 shows arrangement of a conventional hot-swap circuit system for a fan tray module.

In FIG. 1, a conventional hot-swap circuit 1 performs a soft-start operation of a fan tray module 16, using an analog controller IC (integrated circuit) 11 to drive an n-channel metal-oxide semiconductor field effect transistor (MOSFET) 12 serving as a transistor switch, wherein a Zener diode ($D_2$) 13 works as an over-voltage protection device and a resistor set ($R_{10}$, $R_{12}$, $R_{13}$) 14 works as an over-current protection device.

However, the conventional art shown in FIG. 1 has the follow drawbacks. First, the analog controller IC 11 requires costly design and is expensive. Second, the analog controller IC 11 cannot provide a wide range of voltage supply. It can only provide the most negative voltage of −3 volts, and therefore the fan tray module is vulnerable to transient negative voltage when being hot-plugged into the application system (not shown in FIG. 1). Thirdly, the driving capability of the analog controller IC 11 is inadequate for the transistor switch 12. Fourthly, suppression for the voltage spikes and inrush currents is limited when the hot-swap circuit 1 is applied to the fan tray module operating in large current and voltage conditions.

In addition, the hot-swap circuit 1 lacks a discharging loop or path and hence a part of the inrush currents accumulate in the hot-swap circuit 1. The accumulated inrush currents may trigger a current protection device of the application system and crash the application system when the fan tray module 16 is frequently inserted and removed from the application system. For example, lightning interference may trigger the protection mechanism to shut down the power source supplied to the application system. When the power source is quickly recovered and fed to the application system, abnormally large inrush currents will flow into the application system and crash the application system, because the accumulated charges stored in the capacitor set ($C_5$~$C_8$) 15 of the hot-swap circuit 1 are not completely discharged.

SUMMARY OF THE INVENTION

The invention is directed to a hot-swap circuit system for fan tray module, having low fabricating cost and capable of operating under large current and voltage.

The invention is directed to a hot-swap circuit system for fan tray module to improve stability of the fan tray module and the application system in which the fan tray module is hot-plugged.

According to an exemplary embodiment of the invention, the hot-swap circuit system comprises a soft-start circuit module in charge of power-starting the fan tray module when the fan tray module is hot-plugged into an application system. The soft-start circuit module at least includes a capacitor and a field effect transistor. The capacitor discharges when an input voltage of the soft-start circuit module changes from non-zero value to zero value, and the field effect transistor is turned off when an input voltage of the soft-start circuit module changes from non-zero value to zero value.

According to another exemplary embodiment of the invention, the hot-swap circuit system comprises the above soft-start circuit module and a discharging circuit module. The discharging circuit module connects in parallel with the capacitor of the soft-start circuit module, and at least includes an n-channel MOSFET. When the input voltage of the soft-start circuit changes from non-zero value to zero value the n-channel MOSFET is turned on and quickly discharges inrush currents accumulated in the capacitor of the soft-start circuit module to ground, thereby avoiding crashing an application system when the fan tray module is frequently inserted and removed from the application system.

In addition, the hot-swap circuit system of fan tray module according to the invention may further comprise an over-voltage protection module or an over-current protection module or both.

The hot-swap circuit system of fan tray module according to the invention has circuit configuration with low cost design and is suitable for high and low input voltage applications. Moreover, the invention can alleviate sparks, spikes and inrush currents induced from hot-plugging and protect the fan tray module via over-voltage protection device and over-current protection device from being burned out by unexpected current and voltage.

Further scope of the applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will be more fully understood from the detailed description, given hereinbelow, and the accompanying drawings, which are give by way of illustration only, and thus are not limitative of the present invention.

DETAILED DESCRIPTION OF THE PREFERRED EMBODIMENTS

Figure 2:
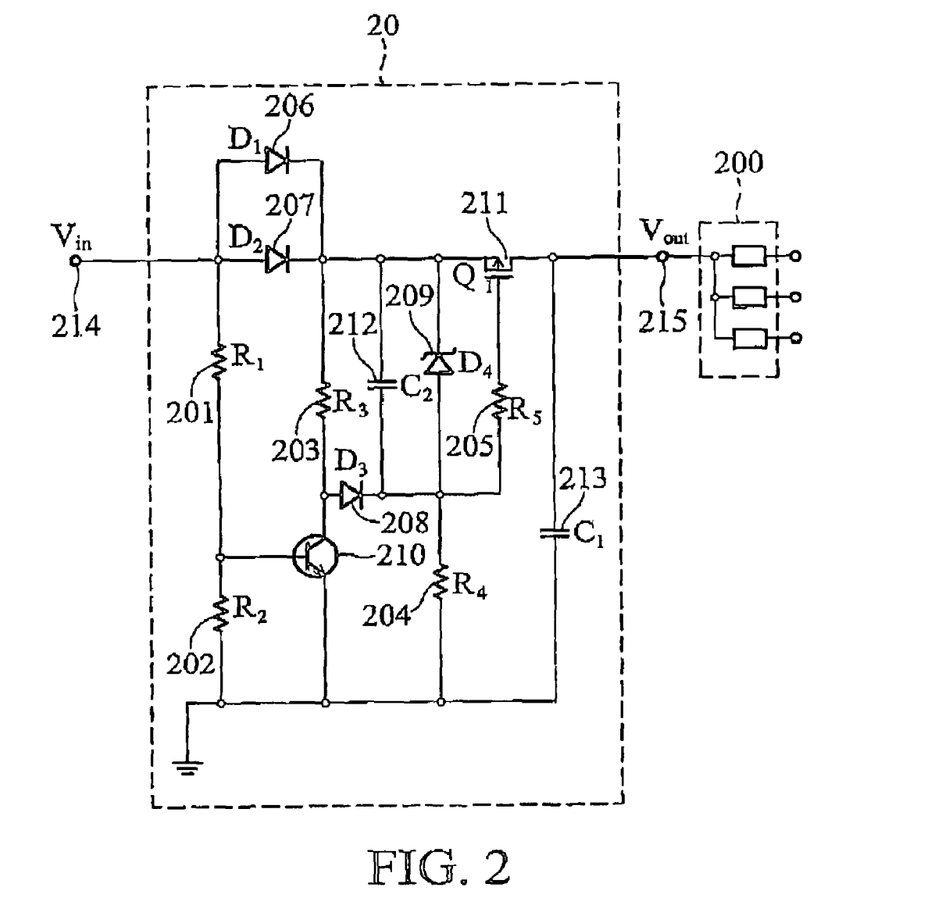
FIG. 2 shows a hot-swap circuit system for a fan tray module according to an embodiment of the invention.

FIG. 2 shows a hot-swap circuit system for a fan tray module 200 according to an embodiment of the invention. The hot-swap circuit system comprises a soft-start circuit module 20 which is constituted of a set of resistors 201~205 ($R_1$~$R_5$), diodes 206~209 ($D_1$~$D_4$), a bipolar transistor 210, a field effect transistor for example a p-channel MOSFET 211 ($Q_1$), and capacitors 212~213 ($C_1$~$C_2$).

The soft-start circuit module 20 through a voltage input terminal 214 receives an input voltage $V_{in}$ output from a voltage source (not shown in FIG. 2) and through a voltage output terminal 215 provides voltage $V_{out}$ to the fan tray module 200 and softly starts the fan tray module 200. In addition, the diodes 206~209 conduct current in single direction, the resistors 201~202 form a voltage divider, a base of the bipolar transistor 210 is electrically connected to one terminal of the resistor 202, and an emitter of the bipolar transistor 210 and the other terminal of the resistor 202 are grounded together. Furthermore, the diode 209 is a Zener diode and is connected in parallel with the capacitor 212.

The field effect transistor 211 switches from a turn-on state (ON) to a turn-off state (OFF) and the capacitors 212~213 release their stored charges when the input voltage $V_{in}$ changes from non-zero value to zero value. In other words, when the input voltage $V_{in}$ changes from non-zero value to zero value, the voltage spikes and inrush currents can be suppressed to minimum levels by utilizing the charging-discharging characteristics of an RC circuit made of active and passive devices, thereby avoiding the sparks resulting from loading effects at the moment the fan tray module 200 is activated. Particularly, design cost for the hot-swap circuit system is reduced due to removing the analog controller IC, overcoming the problems occurring to the conventional hot-swap circuit 1 using the analog controller IC.

In addition, this embodiment (FIG. 3) of the invention can be applied to circuits operating with large voltages and currents, therefore the voltage spikes and inrush currents can be suppressed to a satisfactory extent.

Figure 4:
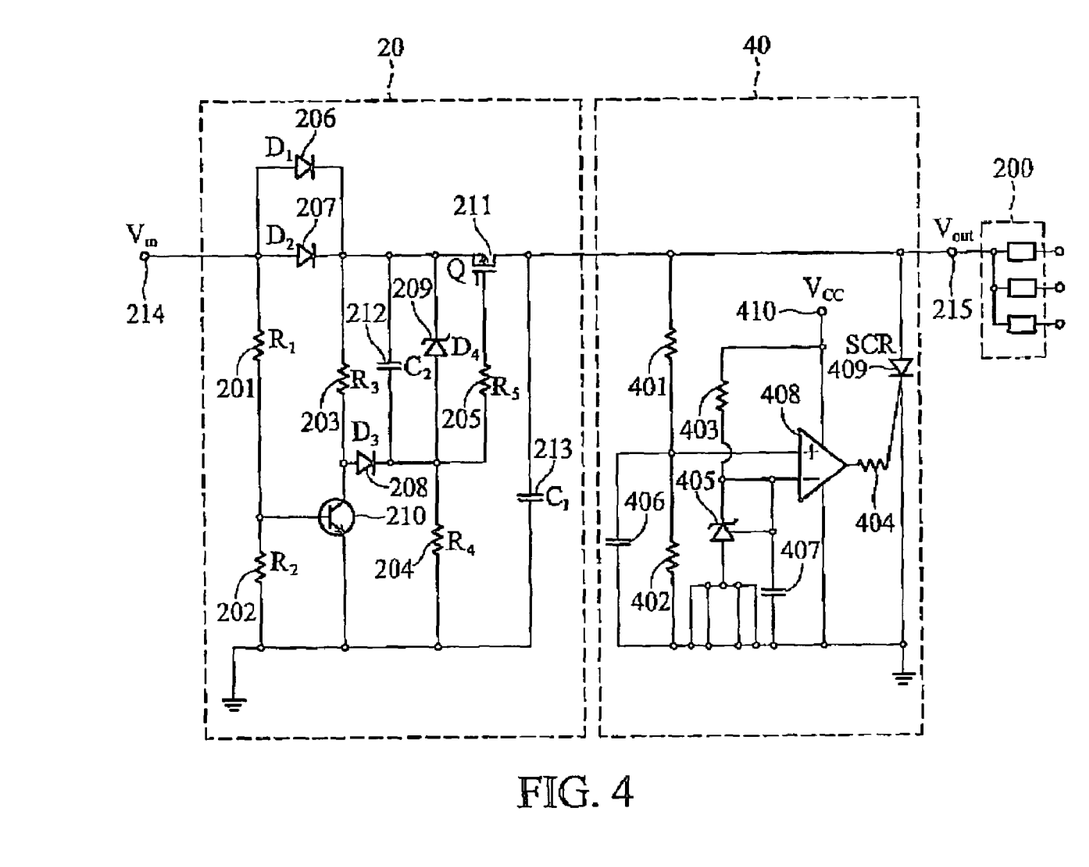
FIG. 4 shows a hot-swap circuit system for a fan tray module according to another embodiment of the invention.

FIG. 4 shows a hot-swap circuit system for a fan tray module 200 according to another embodiment of the invention. In FIG. 4, the soft-start circuit module 20 of the hot-swap circuit system is connected in parallel with an over-voltage protection circuit module 40 to avoid burning down the hot-swap circuit module and fan tray module 200 due to over voltages generated by the application system (not shown in FIG. 4).

In this embodiment (FIG. 4), the over-voltage protection circuit module 40 is connected in parallel with the capacitor 213 of the soft-start circuit module 20. The over-voltage protection circuit module 40 comprises resistors 401~404, a Zener diode 405, capacitors 406~407, an operational amplifier 408, and a silicon control rectifier (SCR) 409. The positive power terminal of the operational amplifier 408 connects to a voltage source $V_{cc}$ through a voltage input terminal 410, the negative power terminal of the operational amplifier 408 is grounded, the output terminal of the operational amplifier 408 connects to the gate of the silicon control rectifier 409 via the resistor 404, the non-inverted input terminal of the operational amplifier 408 connects to one terminal of the capacitor 406, and the inverted input terminal of the operational amplifier 408 connects to one terminal of the capacitor 407. The other terminals of the capacitors 406~407 are commonly grounded.

The over-voltage protection circuit module 40 triggers the silicon control rectifier 409 using the output voltage of the operational amplifier 408 while providing the over-voltage protection mechanism by utilizing the silicon control rectifier 409 to prevent the fan tray module 200 from being burned out due to abnormal voltage.

Figure 5:
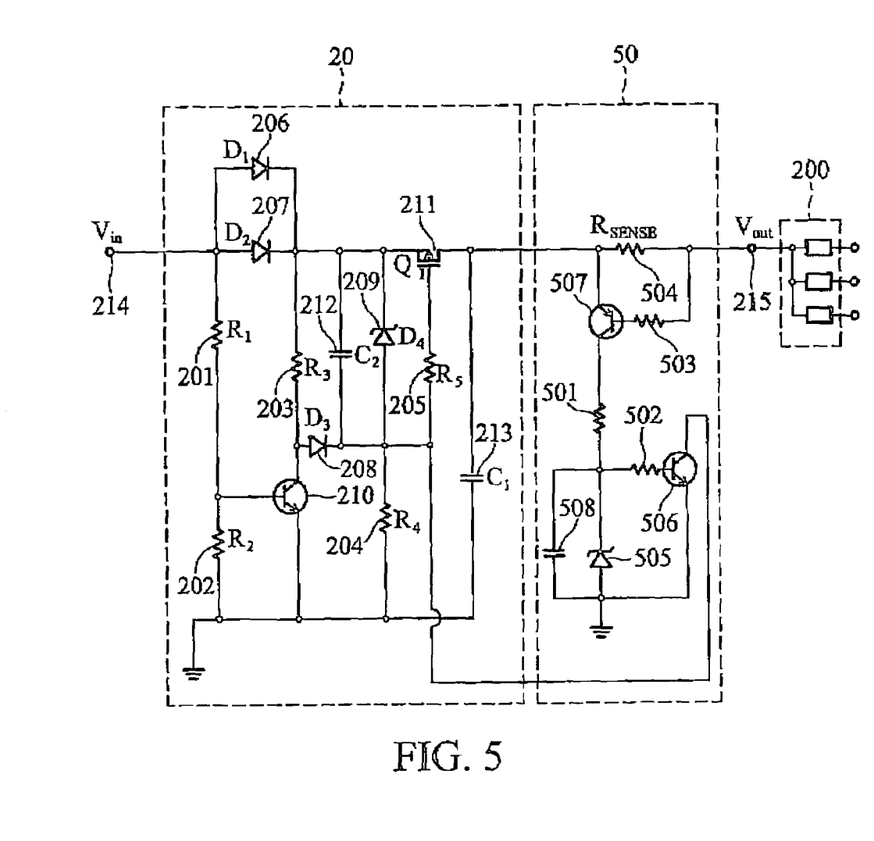
FIG. 5 shows a hot-swap circuit system for a fan tray module according to another embodiment of the invention.

FIG. 5 shows a hot-swap circuit system for a fan tray module 200 according to another embodiment of the invention. In FIG. 5, the soft-start circuit module 20 of the hot-swap circuit system is connected in parallel with an over-current protection circuit module 50 to avoid burning out the hot-swap circuit module and fan tray module 200 due to over currents generated by the application system (not shown in FIG. 5).

In this embodiment (FIG. 5), the over-current protection circuit module 50 is connected in parallel with the capacitor 213 of the soft-start circuit module 20. The over-current protection circuit module 40 comprises resistors 501~503, a sensing resistor 504 ($R_{sense}$, with minimal unit of mΩ), a Zener diode 505, bipolar transistors 506~507, and a capacitor 508. The sensing resistor 504 is electrically connected between the voltage output terminal 215 and an emitter of the bipolar transistor 507, the capacitor 508 connects in parallel with the Zener diode 505, and an emitter of the bipolar transistor 506 is grounded.

In the over-current protection circuit module 50, the bipolar transistor 507 is driven by the voltage across the sensing resistor 504, the current through the sensing resistor 504 is referred to be a reference. When the reference is above a predetermined value, the bipolar transistor 507 is quickly turned off to prevent a large current from conducting continuously.

Figure 3:
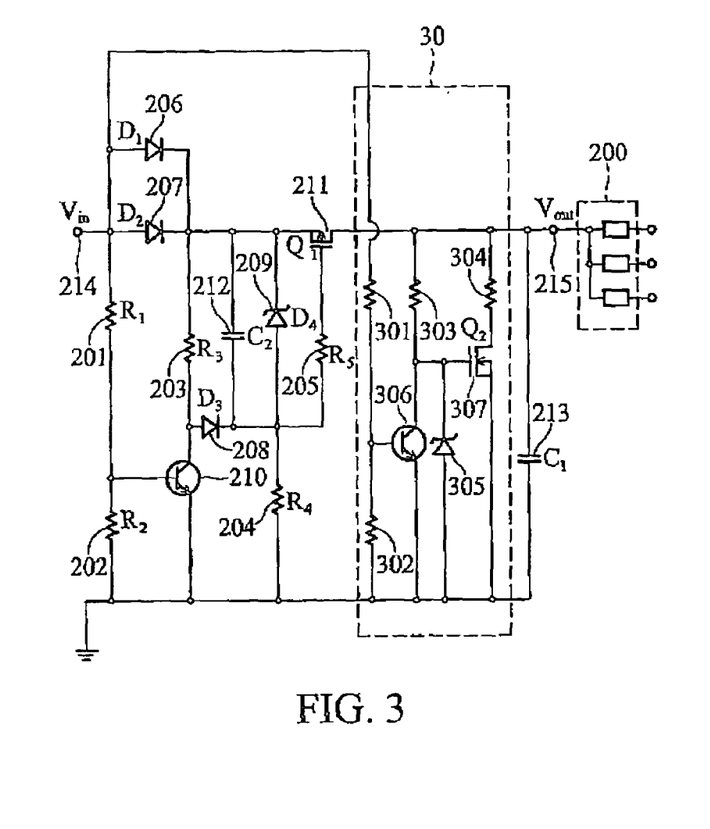
FIG. 3 shows a hot-swap circuit system for a fan tray module according to another embodiment of the invention.

FIG. 3 shows a hot-swap circuit system for a fan tray module 200 according to another embodiment of the invention. In this embodiment (FIG. 3), a discharging circuit module 30 is added to the hot-swap circuit module and connected with the soft-start circuit module 20, for providing a discharge loop or path. In detail, the discharging circuit module 30 is connected in parallel with the capacitor 213, and comprises resistors 301~304, a Zener diode 305, a bipolar transistor 306, and a field effect transistor for example an n-channel MOSFET 307.

When the input voltage $V_{in}$ at the voltage input terminal 214 changes from non-zero value to zero value, the n-channel MOSFET 307 is turned on such that the inrush currents accumulated in the capacitor 213 of the soft-start circuit module 20 are released to ground. System crashes resulting from a sudden large current load can be avoided, under the situation of frequently inserting and removing the fan tray module 200 from the application system (not shown in FIG. 3).

Figure 6:
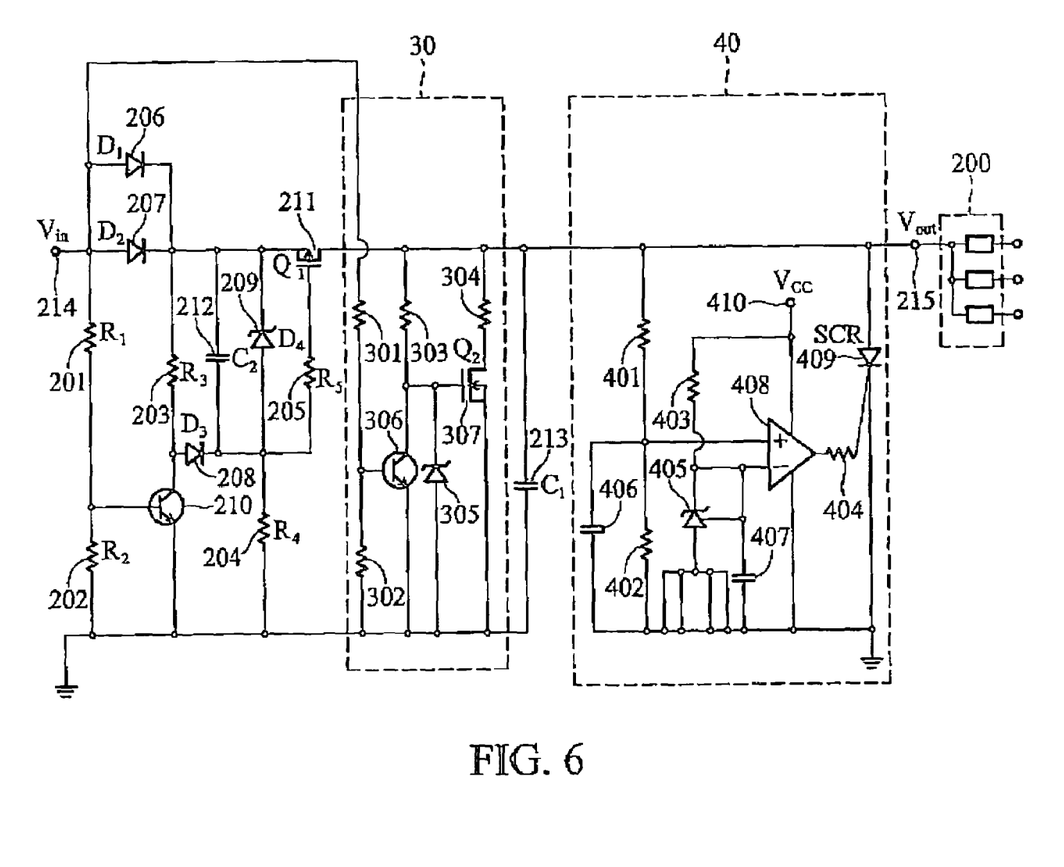
FIG. 6 shows a hot-swap circuit system for a fan tray module according to another embodiment of the invention.
Figure 7:
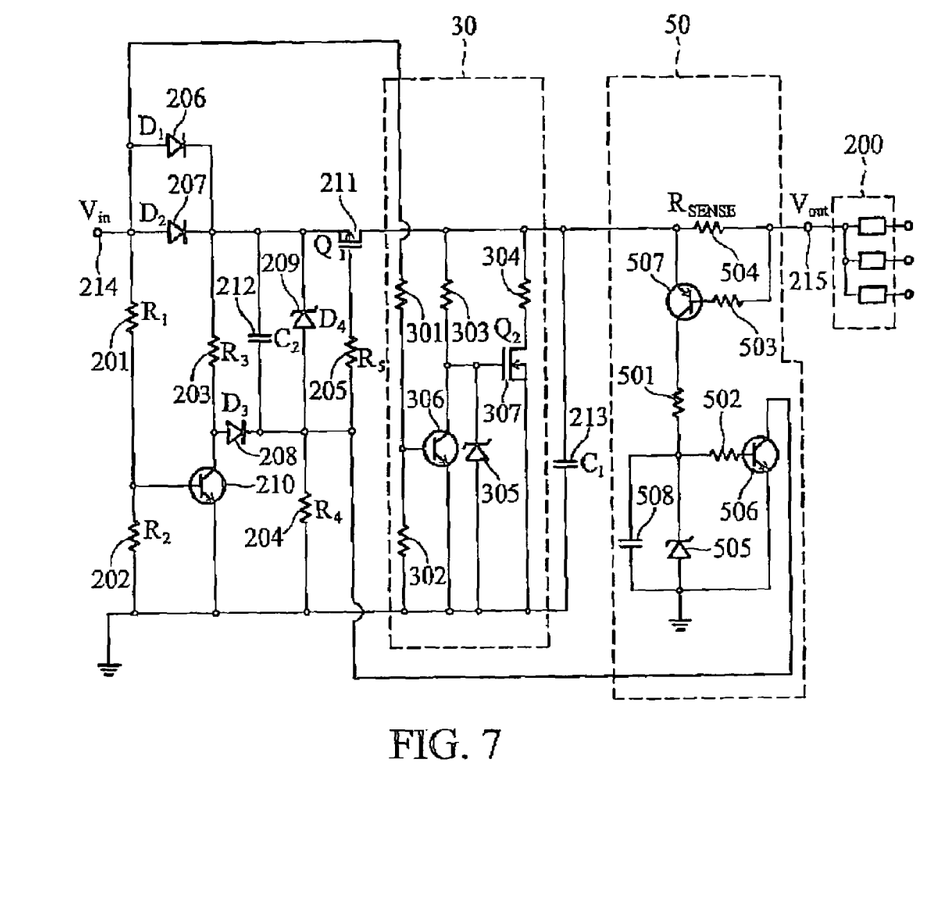
FIG. 7 shows a hot-swap circuit system for a fan tray module according to another embodiment of the invention.

FIG. 6 shows a hot-swap circuit system for a fan tray module 200 according to another embodiment of the invention. The feature of this embodiment (FIG. 6) is that the soft-start circuit module 20 and the discharging circuit module 30 shown in FIG. 3 are connected with the over-voltage protection circuit module 40. Otherwise, as shown in FIG. 7, the soft-start circuit module 20 and the discharging circuit module 30 shown in FIG. 3 can be connected with the over-current protection circuit module 50.

Figure 8:
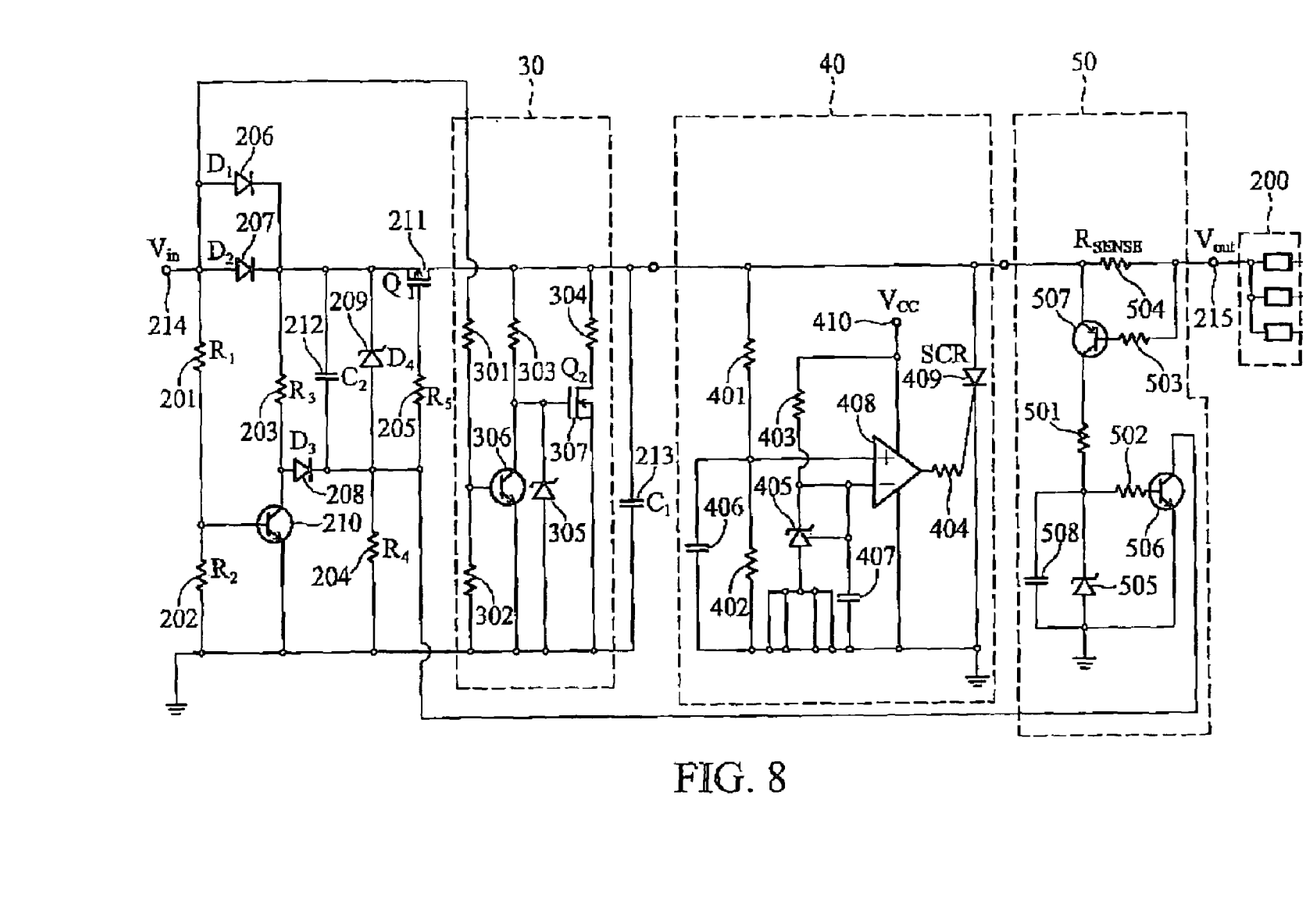
FIG. 8 shows a hot-swap circuit system for a fan tray module according to another embodiment of the invention.

In addition, FIG. 8 shows a hot-swap circuit system for a fan tray module 200 according to another embodiment of the invention. The feature of this embodiment is that the soft-start circuit module 20, the discharging circuit module 30 and the over-voltage protection circuit module 40 shown in FIG. 6 are connected with the over-current protection circuit module 50.

In other words, the hot-swap circuit system according to the invention comprises the soft-start circuit module 20, and can get better performance with addition of the discharging circuit module 30. In addition, the hot-swap circuit system according to the invention can further comprise the over-voltage protection circuit module 40 or the over-current protection circuit module 50, or both the over-voltage protection circuit module 40 and the over-current protection circuit module 50 such that the hot-swap circuit system will not be destroyed by over voltage or over current.

The above embodiments of the invention show the following advantages. First, the circuit configuration is simple and can be economically designed. Second, the hot-swap circuit system can be applied to both low and high voltage input configurations. Thirdly, the hot-swap circuit system can alleviate sparks, voltage spikes and inrush currents generated at the moment the fan tray module is plugged into an application system. Fourthly, over-voltage and over-current protection devices can be added to protect the fan tray module preventing destruction by abnormal voltages and currents.

While the invention has been described by way of example and in terms of preferred embodiment, it is to be understood that the invention is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A hot-swap circuit system for fan tray module comprising:
    a soft-start circuit module having a voltage input terminal for receiving an input voltage, which comprises:
    at least one diode for conducting a current in a single direction,
    a first bipolar transistor having an emitter grounded,
    a first field effect transistor turned off when the input voltage changes from a non-zero value to a zero value,
    a first capacitor having a first terminal electrically connected to a drain of the first field effect transistor and having a second terminal grounded, and discharging when the input voltage changes from the non-zero value to the zero value,
    a second capacitor discharging when the input voltage changes from the non-zero value to the zero value, and
    a first Zener diode electrically connected to the second capacitor in parallel;
    a discharging circuit module electrically connected to the first capacitor in parallel and flowing a discharging current of the first capacitor therethrough;
    an over-voltage protection circuit module electrically connected to the first capacitor in parallel; and
    an over-current protection circuit module electrically connected to the first capacitor in parallel, and having a voltage output terminal electrically connected to the fan tray module.

2. The hot-swap circuit system as claimed in claim 1, wherein the discharging circuit module comprises:
    a second Zener diode;
    a second bipolar transistor; and
    a second field effect transistor turned on when the input voltage changes from the non-zero value to the zero value.

3. The hot-swap circuit system as claimed in claim 1, wherein the over-voltage protection circuit module comprises:
    a third Zener diode;
    an operational amplifier having a positive power terminal connected to a voltage source and a negative power terminal grounded;
    a silicon control rectifier having a gate electrically connected to an output terminal of the operational amplifier;
    a third capacitor having one terminal grounded and the other terminal electrically connected to a non-inverted input terminal of the operational amplifier; and
    a fourth capacitor having one terminal grounded and the other terminal electrically connected to an inverted input terminal of the operational amplifier.

4. The hot-swap circuit system as claimed in claim 1, wherein the over-current protection circuit module comprises:
    a sensing resistor having one terminal electrically connected to the voltage output terminal;
    a fourth Zener diode;
    a third bipolar transistor having an emitter grounded;
    a fourth bipolar transistor having an emitter electrically connected to the other terminal of the sensing resistor; and
    a fifth capacitor electrically connected to the fourth Zener diode in parallel.

5. A hot-swap circuit system for fan tray module comprising:
    a voltage input terminal receiving an input voltage from a voltage source;
    at least one diode for conducting a current in a single direction;
    a bipolar transistor having an emitter grounded;
    a first field effect transistor turned off when the input voltage changes from a non-zero value to a zero value;
    a second field effect transistor turned on when the input voltage changes from the non-zero value to the zero value;
    a first capacitor having one terminal electrically connected to a drain of the second field effect transistor and having the other grounded terminal, and discharging when the input voltage changes from the non-zero value to the zero value;
    a second capacitor discharging when the input voltage changes from the non-zero value to the zero value; and
    a voltage output terminal electrically connected to the fan tray module.

6. The hot-swap circuit system as claimed in claim 5, further comprising an over-voltage protection circuit module connected with the first capacitor in parallel.

7. The hot-swap circuit system as claimed in claim 6, wherein the over-voltage protection circuit module comprises an operational amplifier and a silicon control rectifier which is driven by a voltage output from the operational amplifier.

8. The hot-swap circuit system as claimed in claim 6, further comprising an over-current protection circuit module electrically connected to the first capacitor in parallel, and having at least one sensing resistor.

9. The hot-swap circuit system as claimed in claim 5, further comprising an over-current protection circuit module electrically connected to the first capacitor in parallel, and having at least one sensing resistor.

10. The hot-swap circuit system as claimed in claim 5, further comprising at least one resistor serving as a voltage divider; wherein the resistor has one terminal grounded and the other terminal electrically connected to a base of the bipolar transistor.

11. A hot-swap circuit system for a fan tray module comprising:
   a soft-start circuit module activating the fan tray module when the fan tray module is plugged into an application system, and comprising:
   a first capacitor discharging when an input voltage of the soft-start circuit module changes from a non-zero value to a zero value;
   a first field effect transistor turned off when the input voltage changes from the non-zero value to the zero value;
   at least one diode for conducting a current in a single direction;
   a bipolar transistor having an emitter grounded; and
   a second capacitor discharging when the input voltage changes from the non-zero value to the zero value.

12. The hot-swap circuit system as claimed in claim 11, wherein the soft-start circuit module further comprises:
   at least one resistor serving as a voltage divider and having one terminal grounded;
   wherein the bipolar transistor further has a base electrically connected to the other terminal of the resistor.

13. The hot-swap circuit system as claimed in claim 11, further comprising:
   a discharging circuit module electrically connected to the first capacitor in parallel, flowing a discharging current of the first capacitor to a ground.

14. The hot-swap circuit system as claimed in claim 13, wherein the discharging circuit module comprises a second field effect transistor turned on when the input voltage changes from the non-zero value to the zero value.

15. The hot-swap circuit system as claimed in claim 14, wherein the first field effect transistor is a p-channel metal oxide semiconductor field effect transistor, and the second field effect transistor is an n-channel depletion metal oxide semiconductor field effect transistor.

16. The hot-swap circuit system as claimed in claim 13, further comprising an over-voltage protection circuit module electrically connected to the first capacitor in parallel and having an operational amplifier and a silicon control rectifier driven by the operational amplifier.

17. The hot-swap circuit system as claimed in claim 13, further comprising an over-current protection circuit module electrically connected to the first capacitor in parallel and having a sensing resistor.

18. The hot-swap circuit system as claimed in claim 11, further comprising an over-voltage protection circuit module electrically connected to the first capacitor in parallel and having an operational amplifier and a silicon control rectifier driven by the operational amplifier.

19. The hot-swap circuit system as claimed in claim 18, further comprising an over-current protection circuit module electrically connected to the first capacitor in parallel and having a sensing resistor.

20. The hot-swap circuit system as claimed in claim 11, further comprising:
   a discharging circuit module electrically connected to the first capacitor in parallel, flowing a discharging current of the first capacitor to a ground;
   an over-voltage protection circuit module electrically connected to the first capacitor in parallel; and
   an over-current protection circuit module electrically connected to the first capacitor in parallel.

* * * * *